(12) United States Patent
Cerveny et al.

(10) Patent No.: US 10,558,718 B2
(45) Date of Patent: Feb. 11, 2020

(54) SYSTEMS AND METHODS FOR WEBSITE IMPROVEMENT

(71) Applicant: Dell Products, LP, Round Rock, TX (US)

(72) Inventors: Lukas Cerveny, Bratislava (SK); Arnaud De Jaegher, Bratislava (SK)

(73) Assignee: Dell Products, LP, Round Rock ( * ) Notice: Subject to any disclaimer, the term of this patent is extended or adjusted under 35 U.S.C. 154(b) by 770 days.

(21) Appl. No.: 14/931,095

(22) Filed: Nov. 3, 2015

(65) Prior Publication Data

US 2017/0124192 A1 May 4, 2017

(51) Int. Cl.
*G06F 16/9535* (2019.01)

(52) U.S. Cl.
CPC ................. *G06F 16/9535* (2019.01)

(58) Field of Classification Search
CPC ................ G06F 17/30864; G06F 16/9535
See application file for complete search history.

(56) References Cited

U.S. PATENT DOCUMENTS

| | | | | |
|---|---|---|---|---|
| 7,966,632 B1* | 6/2011 | Pan | ............ | H04N 5/44543 725/45 |
| 8,326,859 B2* | 12/2012 | Paek | ............ | G06Q 10/10 707/767 |
| 8,601,440 B2 | 12/2013 | Massey et al. | | |
| 9,104,773 B2 | 8/2015 | Gandhi et al. | | |
| 2004/0221235 A1* | 11/2004 | Marchisio | ............ | G06F 17/271 715/261 |
| 2006/0265268 A1* | 11/2006 | Hyder | ............ | G06Q 10/063112 705/321 |
| 2008/0201731 A1* | 8/2008 | Howcroft | ............ | H04H 60/46 725/13 |
| 2008/0306830 A1* | 12/2008 | Lasa | ............ | G06Q 30/02 705/14.16 |
| 2009/0089273 A1* | 4/2009 | Hicks | ............ | G06Q 30/02 |
| 2012/0030037 A1* | 2/2012 | Carriero | ............ | G06Q 30/02 705/14.73 |
| 2012/0078829 A1* | 3/2012 | Bodor | ............ | G06F 17/30029 706/45 |
| 2012/0296697 A1 | 11/2012 | Kumar | | |
| 2012/0296967 A1* | 11/2012 | Tao | ............ | G06Q 30/0251 709/204 |
| 2013/0018713 A1 | 1/2013 | Kumar et al. | | |
| 2014/0025532 A1* | 1/2014 | Huang | ............ | G06Q 30/0631 705/26.7 |
| 2014/0119531 A1* | 5/2014 | Tuchman | ............ | G06Q 10/063112 379/265.09 |
| 2015/0032717 A1* | 1/2015 | Cramer | ............ | G06F 17/30867 707/709 |
| 2015/0067502 A1* | 3/2015 | Yang | ............ | G06F 3/01 715/708 |

(Continued)

*Primary Examiner* — Joshua Bullock
*Assistant Examiner* — Tiffany Thuy Bui
(74) *Attorney, Agent, or Firm* — Larson Newman, LLP

(57) ABSTRACT

A method for using evaluation of intent to improve website usability includes gathering page text and input text from pages viewed by a user, generating a word set from the page text and input text, and performing latent dirichlet allocation modeling on the word set to evaluate user intent. The intent can be used to provide recommendations, improve search results, or identify weaknesses in a website design.

7 Claims, 6 Drawing Sheets

(56) References Cited

U.S. PATENT DOCUMENTS

| | | | |
|---|---|---|---|
| 2016/0103932 A1* | 4/2016 | Sathish | G06F 17/30705 |
| | | | 715/767 |
| 2016/0162452 A1* | 6/2016 | Moore | G06F 17/2235 |
| | | | 715/205 |
| 2016/0171540 A1* | 6/2016 | Mangipudi | G06Q 30/0255 |
| | | | 705/14.53 |
| 2016/0171588 A1* | 6/2016 | Linden | G06Q 30/0631 |
| | | | 705/26.7 |
| 2016/0379213 A1* | 12/2016 | Isaacson | G06Q 20/12 |
| | | | 705/44 |
| 2017/0041413 A1* | 2/2017 | Chandhok | H04L 67/26 |
| 2017/0091629 A1* | 3/2017 | Li | G06N 5/04 |
| 2017/0103469 A1* | 4/2017 | Jiao | G06Q 50/01 |
| 2017/0109446 A1* | 4/2017 | Wu | G06F 7/02 |
| 2017/0213274 A1* | 7/2017 | Vijayaraghavan | |
| | | | G06Q 30/0631 |
| 2017/0219373 A1* | 8/2017 | DiMeo | G01C 21/3682 |
| 2017/0235740 A1* | 8/2017 | Seth | G06F 17/3064 |
| | | | 707/738 |
| 2017/0344541 A1* | 11/2017 | Haeusler | G06Q 30/02 |

* cited by examiner

SYSTEMS AND METHODS FOR WEBSITE IMPROVEMENT

FIELD OF THE DISCLOSURE

The present disclosure generally relates to information handling systems, and more particularly relates to systems and methods for website improvement.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
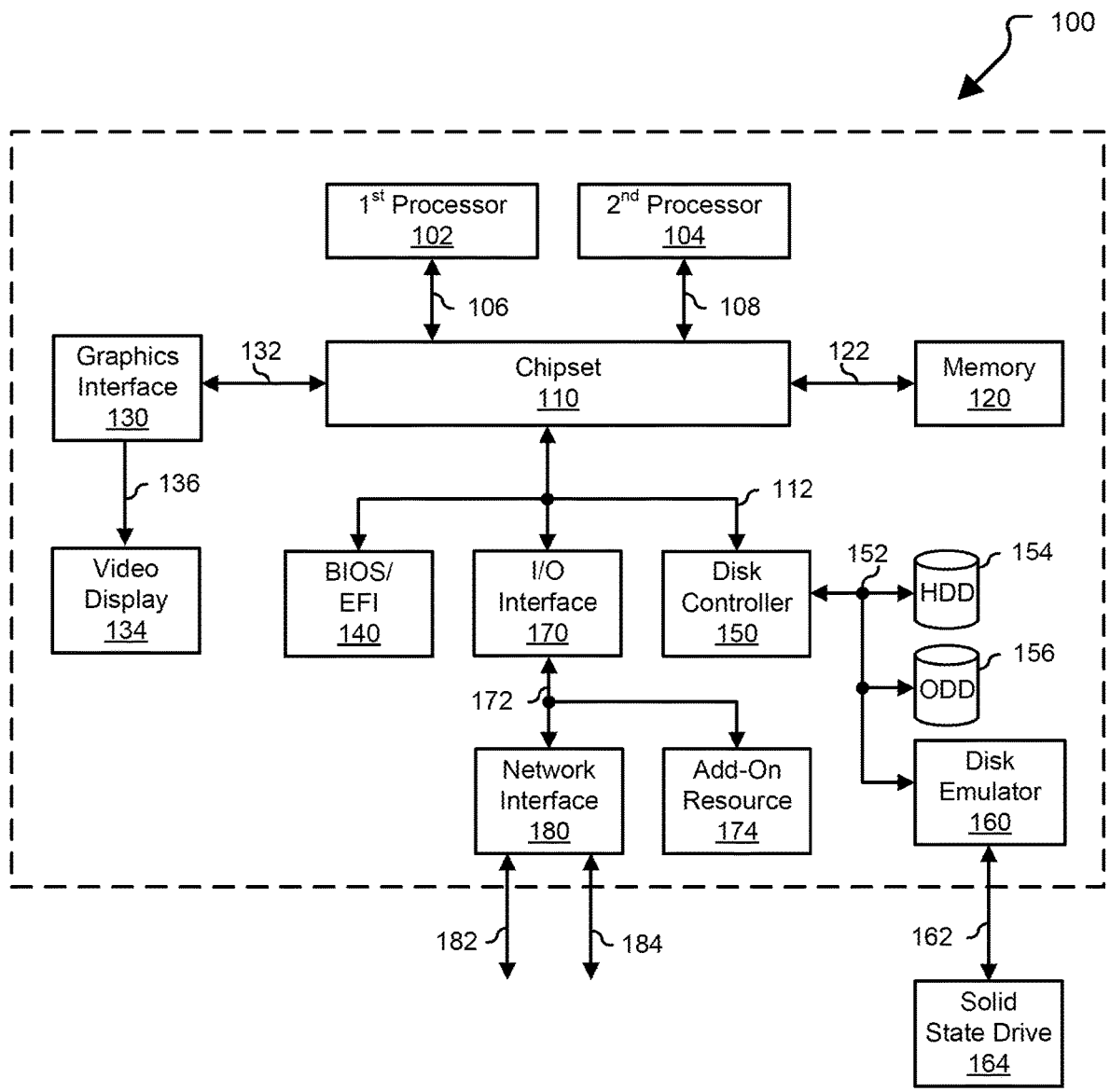
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
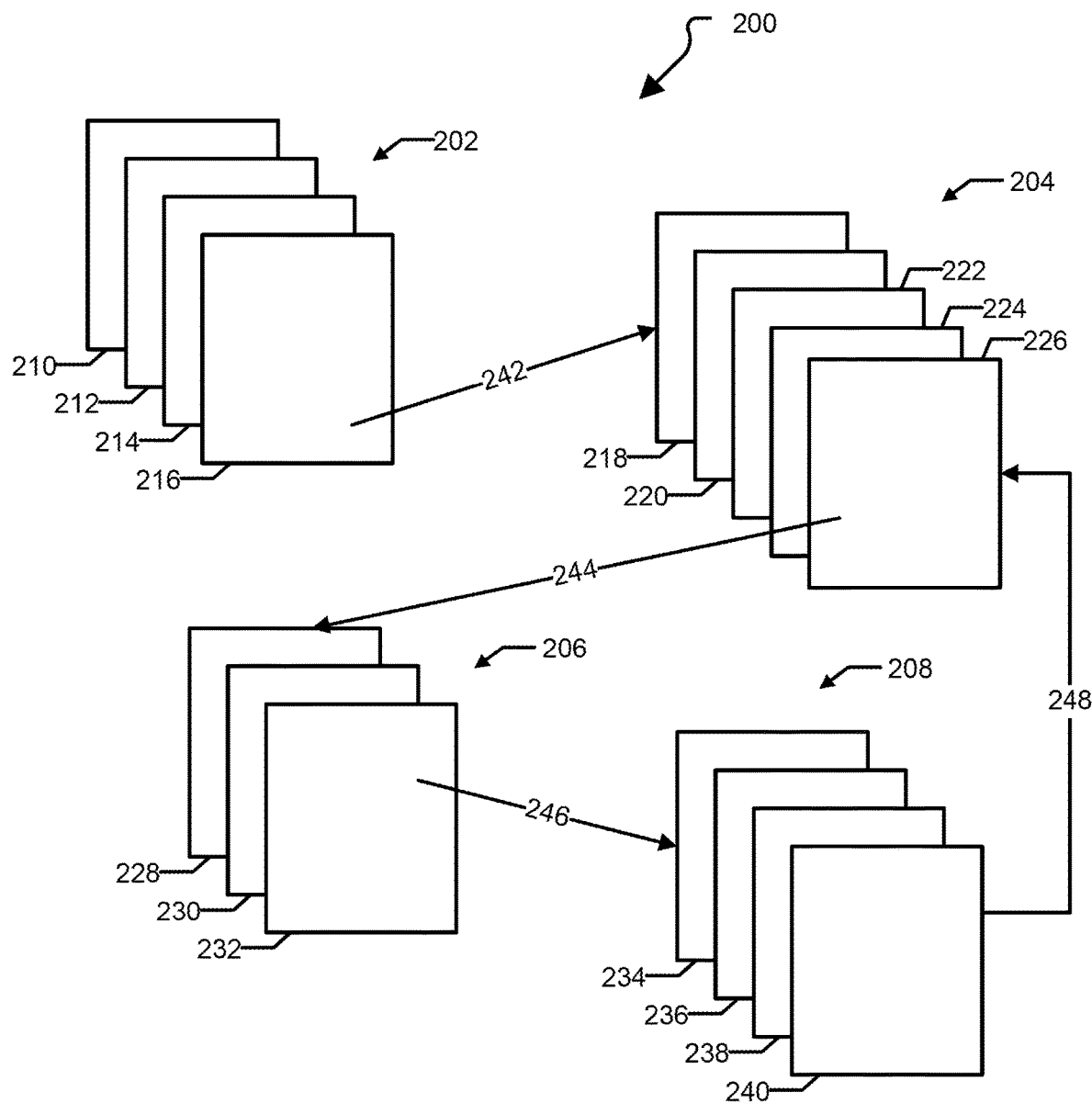
FIG. 2 is a block diagram illustrating navigation through a series of webpages, in accordance with various embodiments.

FIG. 2 shows a user's navigation through a website 200. The website 200 can include a plurality of page sets 202, 204, 206, and 208. Each page set, such as page set 202, can include a plurality of pages, such as pages 210, 212, 214, and 216 in page set 202. Similarly, page set 204 can include pages 218, 220, 222, 224, and 226, pages set 206 can include pages 228, 230, and 232, and page set 208 can include pages 234, 236, 238, and 240.

Page sets can generally contain pages with information related to a subject and a user can navigate in a substantially linear pattern through a series of pages in a page set, such as pages 210, 212, 214, and 216 in page set 202. Generally, this can be accomplished by following links on one page to go to the next page within the page set.

At other times, a user can jump between page sets, such as indicated by arrows 242, 244, 246, and 248. The navigation between page sets can be due to performing a search for another subject, following a link to another area of the website within a header or footer of the page or selecting the a new topic from a dropdown menu.

As illustrated by arrow 248, a user can return to a previously view page, even a previously viewed page set, such as by the page coming up in a search, being presenting in a recommendation, or the user selecting the page from their browser history. Overall, a user's interaction with a website can present them with a series of pages and the pages may be related to different topics.

Figure 3:
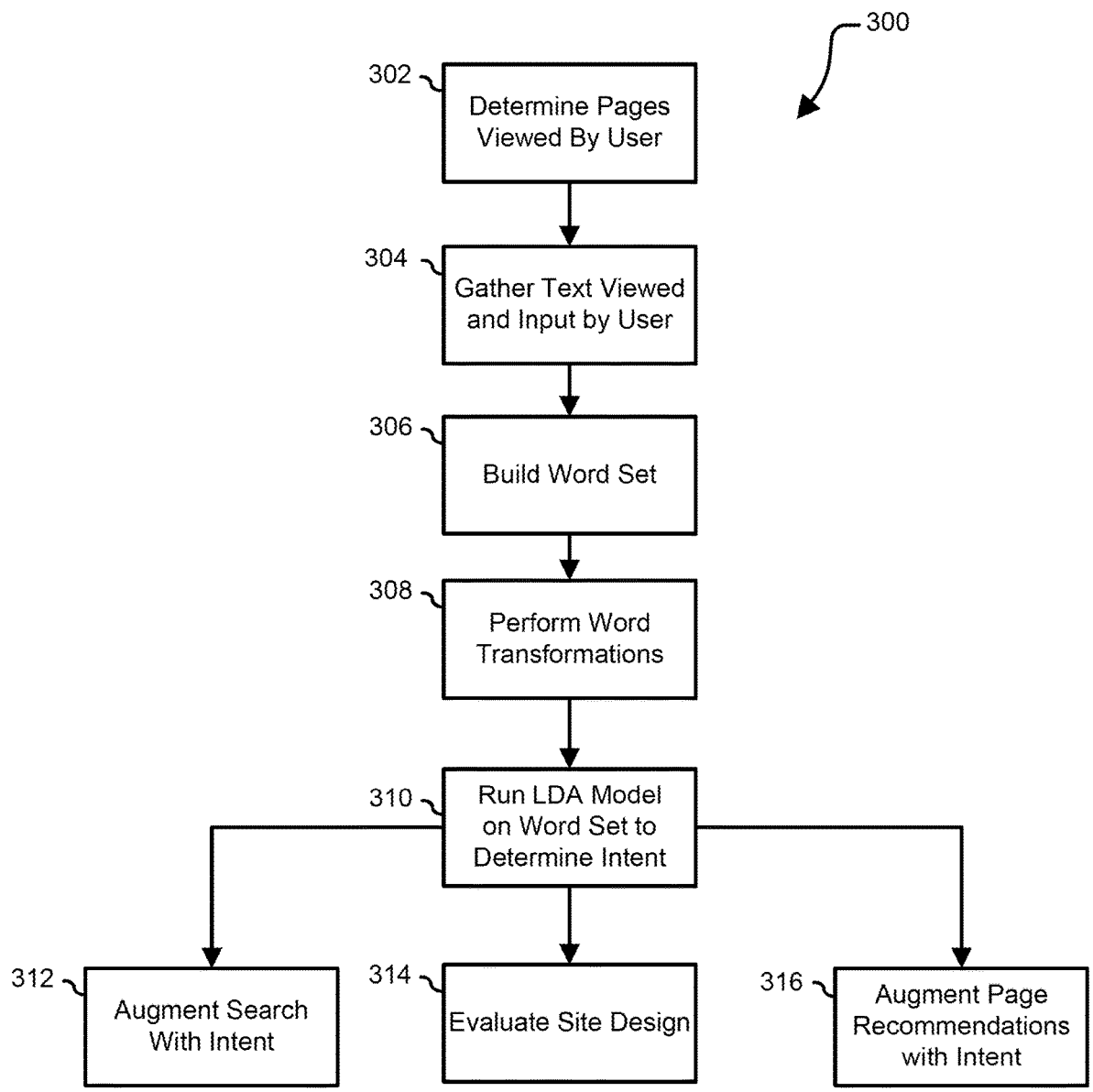
FIG. 3 is a flow diagram illustrating a method of using user intent to improve a web experience, in accordance with various embodiments.

FIG. 3 shows a method 300 of using user intent to improve a user experience with a website. At 302, the system can determine the pages viewed from a website by the user. In various embodiments, the system can track a user's page view history through various means known in the art, such as the use of cookies, referrer pages, and the like. It may be preferable to focus on pages on the website that have been visited and to avoid techniques that can capture a user's browser history or their page views from other websites as users may view this as an invasion of privacy and it may provide limited benefit to the intent analysis.

At 304, the system can gather the text viewed by the user, such as based on the pages visited taken from the page view history, as well as text entered, such as in a search field. Additionally, the text can include web page titles (such as from an HTML <title> tag), header and footer information (such as from HTML <header> and <footer> tags), page metadata (such as from HTML <meta> tags), descriptions of embedded images (such as from an <image> alt attribute), and the like.

At 306, the system can build a word set from the gathered text. The word set can include all of the words of the text. In various embodiments, the word set can include a word more the once to represent all the times the word appears on a page or in the group of pages viewed by the user. In various embodiments, words in links not selected by a user can act as negative words and offset other words in the word set. For example, if "tablet" in the link text that a user does not click, and "tablet" occurs 5 other times on the page, 4 occurrences of "tablet" may be added to the word set, rather than adding "tablet" to the word set 5 or 6 times.

At 308, the system can perform word transformations. In various embodiments, stop words can be removed from the word set. Stop words can include common used words that provide minimal additional meaning, such as "the," "is," "at," "which," and "on." Additionally, word normalization can be performed. For example, plural and singular forms of nouns, such as "tablet" and "tablets" can be normalized to one form, such as the singular form. In another example, verbs can be normalized to a single tense, voice, person, etc. Additionally, other word transformations known in the art can be performed.

At 310, the system can model the intent of the user by applying latent dirichlet allocation (LDA) to the post transformation word set. LDA can allow sets of observations to be explained by unobserved groups that explain why some parts of the data are similar. For example, LDA considers each document or word set as a mixture of a small number of topics and that each word's creation is attributable to one of the document's topics.

In various embodiments, considering the phrases "I eat fish and vegetables," "Fish are pets," and "My kitten eats fish," LDA can discover the topics that these phrases contain. LDA may classify "eat," "fish," and "vegetables" as a first topic (such as being related to food), and "kitten," "fish," and "pets" can be classified as related to a second topic (such as pets). By classifying each word into a topic, the topic of a sentence can be inferred based on the word counts. The phrase "I eat fish and vegetables" can be identified as being related to the first topic, and the phrase "Fish are pets" can be identified as being related to the second topic. The phrase "My kitten eats fish" can be identified as being related to both the first and second topics.

This can be accomplished by identifying a number of topics, such as by an informed estimate or by trial and error. LDA can then assign words to temporary topics according to a Dirichlet distribution. When words appear more than once, they can be assigned to different topics. LDA can then iterative check and update topic assignments, looping through the words in the documents. The topic assignment can be update based on how prevalent the word is across topics and how prevalent topics are in a document. As an example of evaluating the prevalence of words across topics, if a word is a significant portion of the words associated with a first topic but is not associated or only marginally associated with a second topic, the word is more likely to be associated or re-associated with the first topic. As an example of evaluating the prevalence of topics in a document, if a document contains only one topic that has been associated with a word, it is more likely for that word to be associated with that topic. On the other hand, if a document contains multiple topics that have been associated with a word, the likelihood of the word being associated with a particular topic can be a function of the prevalence of words associated with the different topics in the document. By iteratively reassigning words in this way, the word set can be associated with one or more topics or interests of the user.

In various embodiments, one or more intents can be determined for the user based on the LDA results. The intents can be ranked according to a probability, a likelihood, a intent score, or the like. The scoring of the intent can be a function of the number or proportion of pages that were visited associated with the intent or topic, the number or proportion of words associated with the intent or topic, or a combination thereof.

At 312, the system can augment search results using the intent determined by LDA. For example, pages identified by a keyword search can be scored against the intent determined for the user. In another example, refinements of the keywords can be performed based on the intent determined for the user. At 314, the system can evaluate a site design. For example, the site can be scored according to the number and duration of off-intent navigations. Off-intent navigations can include visits to pages on the site that correlate poorly with an intent determined by LDA.

At 316, the system can augment recommendations using the intent determined by LDA. For example, products or webpages of the site can be identified that correlate strongly with the intent determined for the user. Pages that correlate strongly with the intent but have not been visited by the user or products that correlate strongly with the intent can be listed in a portion of a webpage and identified as recommendations for the user.

Figure 4:
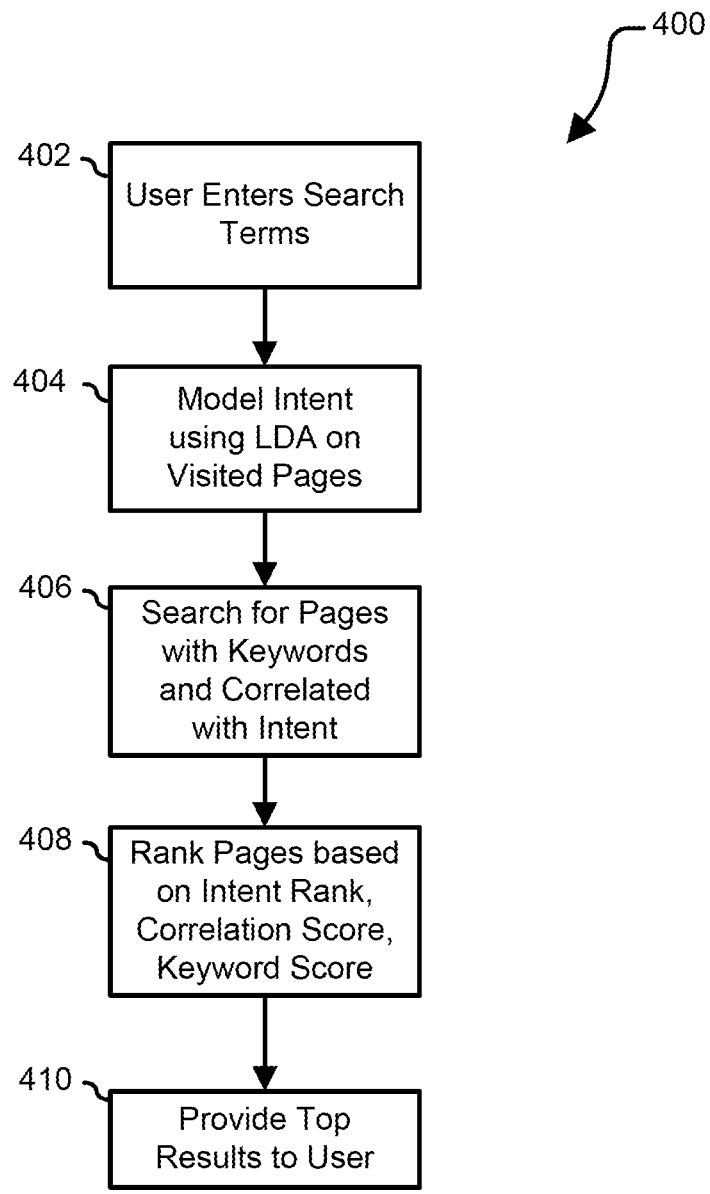
FIG. 4 is a flow diagram illustrating a method of using user intent to improve recommendations to the user, in accordance with various embodiments.

FIG. 4 shows a method 400 of using user intent to improve search results. At 402, a user can enter search terms, such as a list of keywords, natural language search, Boolean search terms, or the like. At 404, the system can model intent using LDA on pages previously visited by the user, such as described for FIG. 3. The system can gather the text and sources of words from the pages visited, generate a word set, and perform LDA modeling to determine one or more intents for the user.

At 406, the system can perform a search for pages on the site that match the keywords. Additionally, the system can determine if the identified pages are correlated with the modeled intent. In various embodiments, the system can perform LDA modeling on each page to identify topics associated with the page and can correlate the page topics with the user intent based on having topics that match the intent. In various embodiments correlation score can be determined based on the number or proportion of words on the webpage associated with the topic that matches the user intent.

At 408, the system can rank the pages. In various embodiments, the pages can be ranked based on the intent score, the correlation score, the keyword score, or any combination thereof. The intent score can be a score for each of the intents determined by LDA for the user and may be a function of the number or proportion of pages visited by the user that are associated with the intent, the number of pages or proportion of words associated with the intent, or other methods used to score and rank user intent based on the LDA modeling. The correlation score can be a function of the number of words on a page that correlate with topics that match a user intent. The keyword score can be a function of the presence of searched keywords on the page, the frequency of occurrence of searched keywords, other measures of relevance, or a combination thereof. In various embodiments, the page ranking can be determined to provide pages that match the keywords and have the highest likelihood of matching the intent of the user.

At 410, the top results can be provided to the user. In various embodiments, the search results can be listed, and the user can scroll through or page through the search results to find something of interest. In various embodiments, the results can be listed along with a score or ranking, such as the scoring functions described in the previous step. Additionally, a brief description of or excerpt from each page may be included in the search results. The results can be presented in such a way that the user can quickly reach any of the pages identified by the search.

Figure 5:
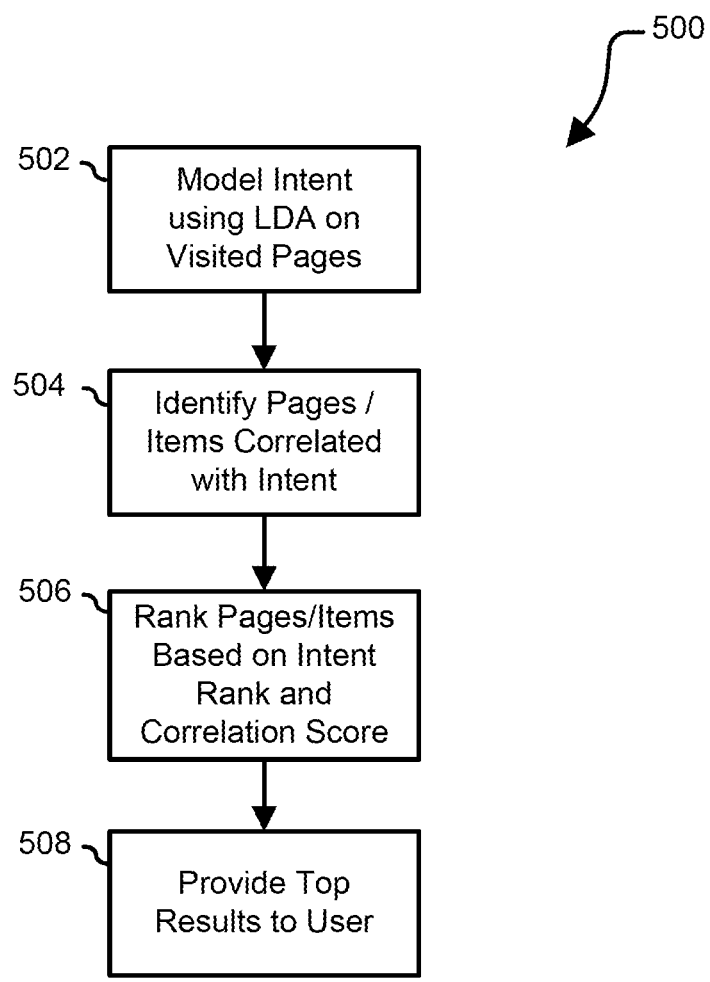
FIG. 5 is a flow diagram illustrating a method of using user intent to improve search results, in accordance with various embodiments.

FIG. 5 shows a method 500 of using user intent to improve recommendation presented to a user. In various embodiments, a support site may provide recommended support pages that are correlated with the user intent. In other embodiments, a online store can provide recommended products that are correlated with the user intent. At 502, the system can model intent using LDA on pages previously visited by the user, such as described for FIG. 3. The system can gather the text and sources of words from the pages visited, generate a word set, and perform LDA modeling to determine one or more intents for the user.

At 504, the system can identify pages or items that correlate with the one or more intents determined by LDA modeling. In various embodiments, the system can perform LDA modeling pages on a website to identify topics. In other embodiments, the pages can be tagged with keyword topics that can match the intent identify by the LDA modeling. In further embodiments, a page can be correlated with intents of users that visit the page or find the page helpful. Similarly, when recommending products, the products can be correlated to topics or intents, either through LDA analysis of a product description (optionally including user reviews of the product), with keywords provided for the product, or by correlating with the intent of users that purchase the product.

At 506, the system can rank the results. In various embodiments, the ranked can be based on the intent score, the correlation score, the keyword score, or any combination thereof. At 410, the top results can be provided to the user. In various embodiments, the results can be displayed in a section of a webpage indicating there are page or product recommendations and provide a brief description, an image, a link to the page or product, or any combination there.

Figure 6:
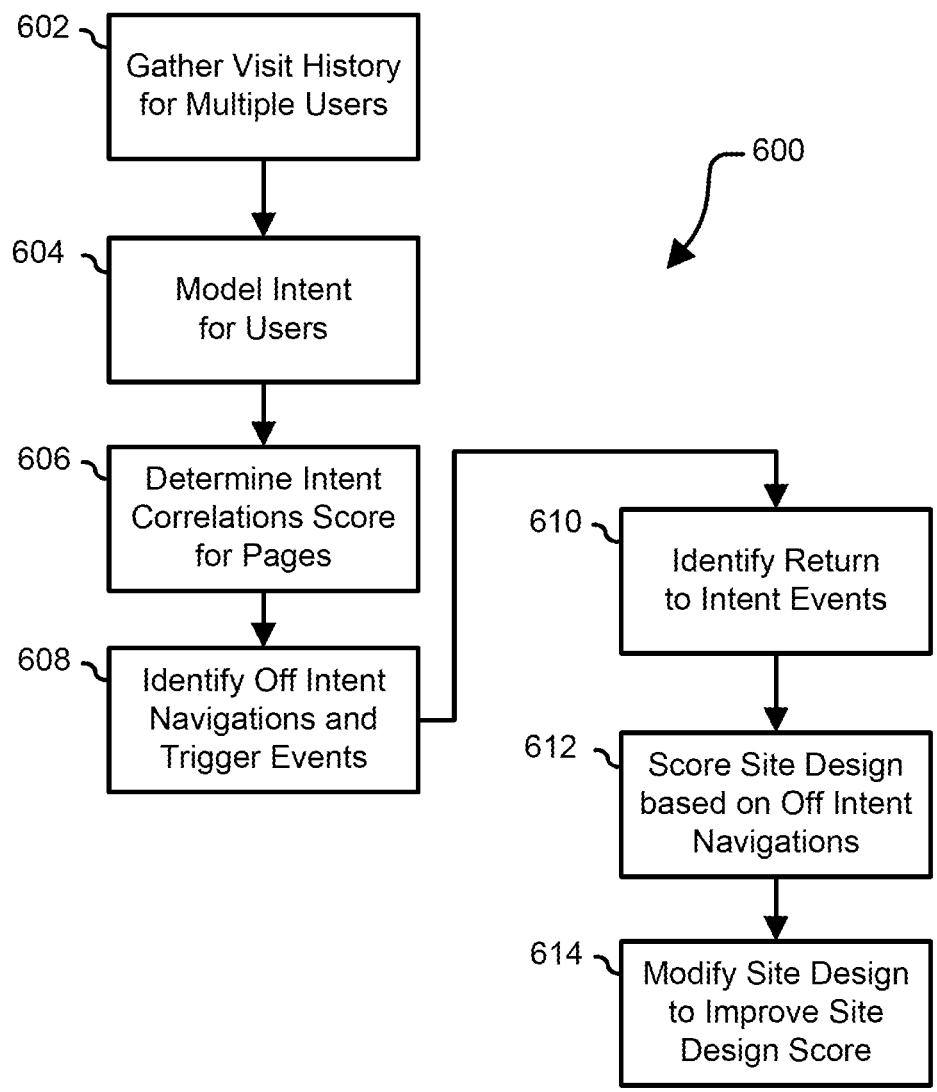
FIG. 6 is a flow diagram illustrating a method of using user intent to evaluate website design, in accordance with various embodiments.

FIG. 6 shows a method 600 of using user intent to evaluate and improve site design. At 602, a browse history of multiple users can be obtained. At 604, the system can model intent using LDA on pages previously visited by the users, such as described for FIG. 3. system can gather the text and sources of words from the pages visited, generate a word set, and perform LDA modeling to determine one or more intents for the users. In various embodiments, the users can be groups according to their intent.

At 606, the system can determine an intent correlation score for each page visited by a user. In various embodiments, the system can perform LDA modeling on each page to identify topics associated with the page and can correlate the page topics with the user intent based on having topics that match the intent.

At 608, off-intent navigations can be identified. An off-intent navigation can be one or more pages visited by the user that is not correlated with the user's intent. When a user history shows they visited a page that is poorly correlated with the user intent, the page can be considered part of an off-intent navigation. Generally, an off-intent navigation can occur when the user selects a link thinking it will get them closer what they are looking for, but the link leads them away. Good site designs will minimize off-intent navigations and guide the user to what they are looking for quickly. Poor site designs can have a number of off-intent navigations or long off-intent navigations where the user goes through several pages before they find a way back to a topic they are interested in.

At 610, the system can identify return-to-intent events. A return-to-intent event can be the link that leads the user from an off-intent navigation back to a page correlated with the user's intent. The return-to-intent event may be a user search, a recommendation, or other link that returns the user to a path leading towards what they are looking for. Additionally, by identifying the beginning and end of an off-intent navigation, the system can determine a duration for each off-intent navigation.

At 612, the system can score a site design. For example, the score can be a function of the frequency of off-intent navigations (indicating how frequently the site has links that can mislead users), the duration of off-intent navigations (indicating how frequently the site provides a link back to a relevant topic), or any combination thereof. In various embodiments, the score can be used to compare two possible site designs. This can be used to ensure a site redesign is effective at simplifying the users experience when trying to locate information. In other embodiments, the score can be tracked with each iteration of a website design to ensure a site design modification does not make it more difficult for the user to find the things for which they are looking.

At 614, the site can be modified to improve site design. The site design score can guide modification. Additionally, the links that led to a large number of off-intent navigations can be reviewed and modified to reduce user confusion. Furthermore, return-to-intent events can be reviewed to improve their placement throughout the site, such as by increasing their frequency, visibility, or the like.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for using evaluation of intent to improve an online support website, comprising:
   storing in computer memory page text and input text from web pages viewed by a user; using a processor to generate a word set from the page text and input text;
   generating a total number of occurrences of a particular word in the page text and input text by subtracting negative scored words for the particular word from other occurrences of the particular word within the page text and input text; storing the total number of occurrences of the particular word in the word set;
   transforming the word set to removing stop words and to perform word transformations;
   normalizing nouns to one form and verbs to a single tense, person, and voice; performing latent dirichlet allocation modeling on the word set to evaluate user intent, wherein the evaluation of user intent includes determining one or more user intents based on the latent dirichlet allocation modeling;
   redetermining intent after additional page visits and refining the recommendations based on the redetermined intent, wherein the redetermined intent includes identifying topics associated with the additional page visits and the refined recommendations are based on the topics;
   ranking the one or more user intents according to a probability of the one or more user intents;
   selecting one of the user intents based on the ranking of the one or more user intents; and
   providing support pages likely to help with a problem the user is experiencing to the user based on the user intent.

2. The method of claim 1, wherein the page text includes page titles, text on a page, keywords, page metadata, or any combination thereof.

3. The method of claim 1, wherein the recommendations are ranked by a correlation score, an intent score, or any combination thereof.

4. A method for using evaluation of intent to improve website usability, comprising:
   using a processor to gather page text and input text from web pages viewed by a user; generating a word set from the page text and input text;
   performing latent dirichlet allocation modeling on the word set to evaluate user intent; correlating pages visited with the user intent;
   identifying off-intent navigations and return-to-intent navigations, wherein off-intent navigations are one or more pages visited that are not correlated with the user intent;
   calculating a duration of the off-intent navigations based on the number of pages viewed between an off-intent navigation and a corresponding return-to-intent navigation;
   scoring a site design based on frequency of off-intent navigations and duration of off-intent navigations;
   in response to the scoring of the site design, identifying links that led to a particular number of off-intent navigations;
   modifying the identified links to improve the scoring of the site design;
   tracking the site design score as changes are made to the site design or comparing the site design score across multiple site designs; and
   writing results of the scoring to computer memory.

5. The method of claim 4, further comprising transforming the word set to removing stop words, to normalize nouns to one form and verbs to a single tense, person, and voice, and to perform word transformations.

6. The method of claim 4, wherein the page text includes page titles, text on a page, keywords, page metadata, or any combination thereof.

7. The method of claim 4, wherein the user intent include more than one intent scored by a likelihood or probability of the intent.

* * * * *